UNITED STATES PATENT OFFICE.

HEINRICH BRUNE AND HEINRICH HORST, OF FRANKFORT-ON-THE-MAIN, GERMANY, ASSIGNORS TO EUGEN ABRESCH, OF NEUSTADT-ON-THE-HARDT, GERMANY.

PROCESS FOR DRYING RAW PEAT.

1,033,779.  Specification of Letters Patent.  Patented July 30, 1912.

No Drawing.  Application filed September 18, 1911.  Serial No. 650,016.

*To all whom it may concern:*

Be it known that we, HEINRICH BRUNE, engineer, and HEINRICH HORST, engineer, both subjects of the German Emperor, and residents of Frankfort-on-the-Main, Germany, with the post-office address Taunusstrasse No. 1, have invented new and useful Improvements in Processes for Drying Raw Peat, of which the following is a specification.

This invention relates to a process for drying raw peat in presses with use of porous admixtures. As such admixtures having for their object to make the raw peat pervious, there have been proposed in the wet press processes, ashes, small coal, sawdust, chaff, coke made from coal and peat, comminuted straw and the like; no commercial success, however, has attended any attempts to make with such admixtures compressed peat which is dried hard and is therefore directly applicable as fuel. The said admixtures are on the one hand troublesome to procure, which is disadvantageous in practising the process, and on the other hand do not give rise to the desired condition, that is to say the perviousness they impart does not suffice to enable the whole of the water to be separated from the raw peat by the pressure of the press. In particular the use of peat coke as an admixture has entirely failed, because the ignition temperature of the coke is higher than the combustion temperature of the peat. In this case therefore, the peat burns without igniting the peat coke.

The invention consists in adding to the raw peat to be pressed, compressed peat which has been dried hard, which can be withdrawn continuously from the finished product. This admixture imparts to the raw peat the property of giving up in the press the whole of the water it contains, so that by this wet press process there is obtained hard dry compressed peat directly applicable as fuel. For the commercial application of the invention it is obviously of considerable importance that the admixture can be continuously withdrawn from the finished product, for in this manner all the costs hitherto attending the procuring of the admixture to be used are eliminated.

It is a known practice in the preparation of peat by machinery, to add to the raw peat in the continuous block cutting machine, peat dust for the purpose of hastening the drying of the blocks of the peat. Peat dust, however, is not applicable as admixture for the purposes of this invention because it is not sufficiently dense. With peat dust the mixing and pressing must be performed very quickly in order to prevent the peat dust from falling out of the raw peat. If, however, compressed, that is to say dense dried peat is used according to this invention, the mixing and pressing operations can be considerably extended, which means working under better conditions.

It has been found that the object of the invention is more easily attained if the mixture of raw peat and compressed peat is subjected to a continuously and gradually increasing pressure and it is a feature of this invention that the wet press process is used in combination with the application of hard dried compressed peat as an admixture, the pressure being continuously and gradually raised.

Now what we claim and desire to secure by Letters Patent is the following:

1. A process for drying raw peat, which process consists in mixing with the raw peat hard dried compressed peat and pressing the mixture.

2. A process for drying raw peat, which process consists in mixing with the raw peat hard dried compressed peat and subjecting the mixture to a continuously and gradually increasing pressure.

In testimony, that we claim the foregoing as our invention, we have signed our names in presence of two witnesses, this fifth day of September 1911.

HEINRICH BRUNE.
HEINRICH HORST.

Witnesses:
JEAN GRUND,
CARL GRUND.

---

Copies of this patent may be obtained for five cents each, by addressing the "Commissioner of Patents, Washington, D. C."